(12) United States Patent
Pfannkuchen et al.

(10) Patent No.: US 8,707,813 B2
(45) Date of Patent: Apr. 29, 2014

(54) SHIFTABLE TWIN GEAR FOR A TWIN-CLUTCH TRANSMISSION AND TWIN-CLUTCH TRANSMISSION

(75) Inventors: Ingo Pfannkuchen, Friedrichshafen (DE); Harald Rüdle, Stuttgart (DE)

(73) Assignee: Daimler AG, Stuttgart (DE)

( * ) Notice: Subject to any disclaimer, the term of this patent is extended or adjusted under 35 U.S.C. 154(b) by 226 days.

(21) Appl. No.: 13/065,818

(22) Filed: Mar. 30, 2011

(65) Prior Publication Data

US 2011/0174104 A1     Jul. 21, 2011

Related U.S. Application Data

(63) Continuation-in-part of application No. PCT/EP2009/006549, filed on Sep. 9, 2009.

(30) Foreign Application Priority Data

Oct. 9, 2008   (DE) .................... 10 2008 050 964

(51) Int. Cl.
*F16H 3/08*   (2006.01)
(52) U.S. Cl.
USPC .......................................................... 74/331
(58) Field of Classification Search
USPC .................... 74/325, 329, 331, 333
See application file for complete search history.

(56) References Cited

U.S. PATENT DOCUMENTS

| 7,895,910 | B2 * | 3/2011 | Caenazzo et al. | 74/331 |
| 7,987,739 | B2 * | 8/2011 | Okadome et al. | 74/331 |
| 8,156,835 | B2 * | 4/2012 | Suzuki | 74/331 |
| 8,307,729 | B2 * | 11/2012 | Chazotte | 74/331 |
| 8,336,411 | B2 * | 12/2012 | Ross et al. | 74/330 |
| 2006/0054441 | A1 | 3/2006 | Ruedle | |

FOREIGN PATENT DOCUMENTS

| DE | 10 2004 043 939 | 4/2006 |
| EP | 1 323 953 | 7/2003 |
| GB | 2 172 944 | 10/1986 |
| JP | 08 074949 | 3/1996 |
| JP | 2008 038932 | 2/2008 |
| JP | 2008 038932 A | 2/2008 |

* cited by examiner

*Primary Examiner* — Ha D Ho
(74) *Attorney, Agent, or Firm* — Klaus J. Bach

(57) ABSTRACT

In a shiftable twin gear for a twin-clutch transmission and a twin-clutch transmission, to reduce the effort and costs involved in bearing-mounted idler gears, and in order to provide a simplified twin-clutch transmission a bearing sleeve which is non-rotatable with respect to a first gear body and which has a first bearing region for the bearing support of a second gear body is in the form of a separate component which is press-fitted to the first gear body.

7 Claims, 3 Drawing Sheets

SHIFTABLE TWIN GEAR FOR A TWIN-CLUTCH TRANSMISSION AND TWIN-CLUTCH TRANSMISSION

This is a Continuation-In-Part application of pending international patent application PCT/EP2009/006549 filed Apr. 15, 2010 and claiming the priority of German patent application 10 2008 050 964.7 filed Oct. 9, 2008.

The invention relates to a shiftable twin gear for a twin-clutch transmission and to a twin-clutch transmission.

DE 10 2004 049 832 A1 discloses a twin-clutch transmission with up to seven forward gears and one reverse gear. This transmission comprises a hollow shaft and an inner shaft which can be coupled to a drive unit by means of a twin-clutch. In addition to the hollow shaft and the inner shaft, a first and a second countershaft are provided with drive pinions which drive a drive gear of a differential unit. To provide for the seven forward gears and the reverse gear, the hollow shaft is fitted with two fixed gears and the inner shaft is fitted with three fixed gears, which mesh with idler gears rotatably supported by countershafts. To provide for the reverse gear, one of these idler gears is arranged adjacent the idler gear for the third forward gear, with the result that high differential speeds occur between these two idler gears when travelling in the third gear. The arrangement results in high expenses and efforts to provide the bearing-support for these idler gears and also in relatively high drag forces.

From DE 2004 043 939 A1, a twin-clutch transmission is known with which six forward gears and one reverse gear can be provided. This transmission comprises a shiftable twin gear arrangement with a first gear body supported on a countershaft and with a second gear body, wherein the two gear bodies can be non coupled to each other for joint rotation. A bearing sleeve is provided which is integral with the first gear body and has a first bearing region on which the second gear body is supported.

It is the object of the present invention to provide a twin-clutch gearbox which can be manufactured in simple and cost-effective manner.

SUMMARY OF THE INVENTION

In a shiftable twin gear for a twin-clutch transmission and a twin-clutch transmission, to reduce the effort and costs involved in bearing-supported idler gears, and in order to provide a simplified twin-clutch transmission, a bearing sleeve which is non-rotatable with respect to a first gear body and which has a first bearing region for the bearing support of a second gear body is in the form of a separate component which is press-fitted to the first gear body.

By means of this bearing sleeve provided on the first twin gear body, the second gear body is excluded from the force path for the axial support of the first gear body, whereby the differential speeds which have to be taken into account when mounting the first gear body are reduced significantly and the cost and the effort involved in bearing-mounting are kept low.

According to the invention, the bearing sleeve is a separate component and press-fitted to the first gear body. Such a design simplifies the manufacture of the components and the subsequent installation of the shiftable twin gear.

According to a particularly preferred embodiment of the invention, a clutch with a shift sleeve is provided for the non-rotatable connection between the first and second gear bodies. Such a clutch allows a mutual support of the first and second gear bodies, thus contributing to a simplified mounting arrangement.

According to a further preferred embodiment of the invention, the bearing sleeve has on its outside a first region for a first needle bearing for the support of the second gear body. Such a bearing arrangement can be constructed from standard components and therefore implemented particularly easily in praxis.

According to a further preferred embodiment of the invention, it is provided that a first annular section of the first gear body and a second annular section of the second gear body are designed as plain bearing surfaces relative to each other. Such a design allows a design of a selectable twin gear using only a few components, the axial support of the gear bodies being possible within close tolerances.

According to a further preferred embodiment of the invention, it is provided that the bearing sleeve has a support surface on its end face. This design simplifies the axial support of the shiftable twin gear according to the invention.

According to a further preferred embodiment of the invention, it is provided that the bearing sleeve has a first stop for the axial support of the second gear body. This design simplifies the mounting of the second gear body with respect to the first gear body.

The bearing sleeve may alternatively be integrated with the first gear body. In this design, a thrust washer is preferably provided in addition.

According to a further preferred embodiment of the invention, a first and a second thrust bearing, which are preferably formed in sections on a first and a second synchronizing body respectively, are provided for axial support. This design results in a very precise bearing arrangement while using relatively few components.

According to a further preferred embodiment of the invention, synchroniser parts are provided on the first and second gear bodies.

The advantages of the invention will become particularly evident in a twin-clutch transmission, if an idler gear provided for the reverse gear and an adjacent idler gear for a forward gear are provided in the form of a switchable twin gear. For this reason, independent protection is claimed for a twin-clutch transmission as well.

The invention will become more readily apparent from the following description of a particular embodiment thereof described below with reference to the accompanying drawings.

DESCRIPTION OF A PARTICULAR EMBODIMENT OF THE INVENTION

Figure 1:
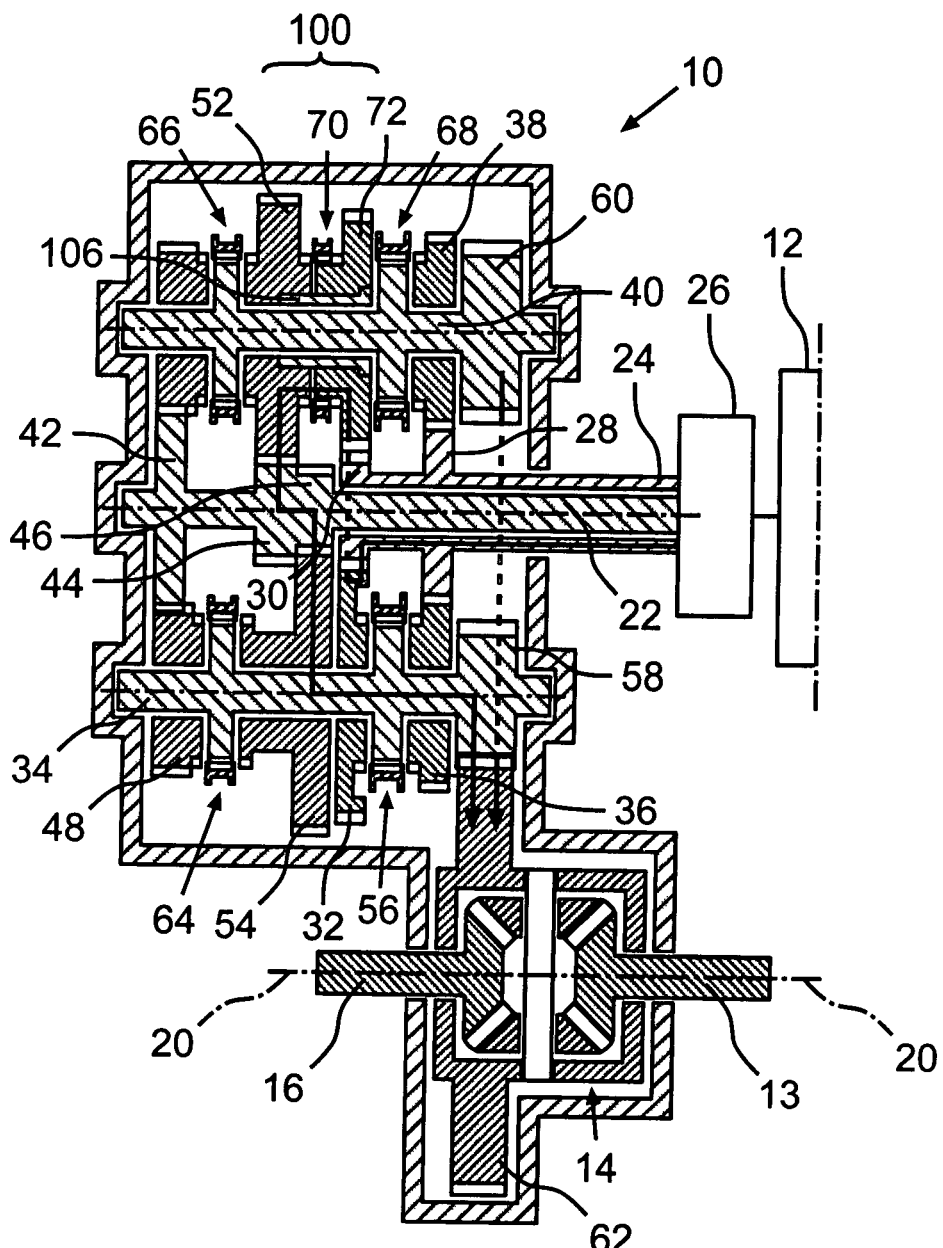
FIG. 1 shows a preferred embodiment of a twin-clutch transmission according to the invention.

FIG. 1 shows a twin-clutch transmission 10 in a front drive-transverse engine configuration. In the drawing plane, a drive unit in the form of an internal combustion engine 12 is seen at the right-hand side. A differential 14 together with its drive shafts 16, 13 for output to a front axle 20 is seen at the bottom in the drawing. For simplicity, the illustrated transmission shafts are shown in one drawing plane. In practice, all four geometrical main axes extend parallel to one another with a spatial offset.

The twin-clutch transmission 10 has input-side transmission input shafts of which one is designed as a radially inner shaft 22 and the other as an outer hollow shaft 24 which encloses the axially right-hand section of the inner shaft 22.

At the right-hand end of the two transmission input shafts 22, 24, which is close to the drive engine 12, the two main clutches of the twin-clutch 26, which are not shown in detail, are located. Each of the two main clutches can be frictionally coupled to the drive engine 12 independently of the other main clutch. Between the twin-clutch 26 and the gears lined up on the two transmission input shafts 22, 24, there is a partition on which the hollow shaft 24 is supported axially and radially by means of an antifriction bearing arrangement. The antifriction bearing arrangement is preferably a sealed single-row deep-groove ball bearing. The partition extends radially outwards to the right, so as to form a bell housing for the accommodation of the twin-clutch.

Two axially consecutive first and second fixed gears 28, 30 of a diameter which is smaller from the right-towards the left-hand side are disposed on the hollow shaft 24 for rotation therewith. The two fixed gears 28, 30 are integrated with the hollow shaft 24.

On the side adjacent to the drive engine 12, a circlip which likewise bears against the deep-groove ball bearing is installed into an annular groove of the hollow shaft 24. The second fixed gear 30 is assigned to the second forward gear ($2^{nd}$) and meshes with an idler gear 32 mounted on a lower countershaft 34. The first fixed gear 28 on the hollow shaft 24 is assigned to the fourth forward gear ($4^{th}$) and meshes with an idler gear 36 mounted on the lower countershaft 34. In addition, the first fixed gear 28 is assigned to the sixth forward gear ($6^{th}$) and meshes with an idler gear 38 mounted on the upper countershaft 40.

The two ends of each of the two countershafts 34, 40 are in the form of journals and supported by means of tapered roller bearings in an X-arrangement in a three-part transmission housing consisting of the partition referred to above with an integral bell housing, a gear housing and a main shaft cover.

The inner shaft 22 axially projects from the enclosing hollow shaft 24. The projecting section of the inner shaft 22 supports the three fixed gears 42, 44, 46. These three fixed gears 42, 44, 46 have diameters which become smaller from a left-hand end of the inner shaft 22 toward the right. At the outermost left-hand end, the inner shaft 22 is supported in the gear housing by means of an antifriction bearing in the form of a sealed deep-groove ball bearing. This gear housing is a part separate from the partition described above.

The fixed gear 42 of the inner shaft 22 which has the largest diameter is assigned to the fifth forward gear ($5^{th}$) and meshes with an idler gear 48 of the lower countershaft 34. The largest fixed gear 42 further meshes with an idler gear 50 of the upper countershaft 40. The idler gear 50 is assigned to the seventh forward gear ($7^{th}$). The largest fixed gear 42 and the two idler gears 48, 50 therefore mesh in a gear plane. The fixed gear 44 of the inner shaft 22 which has the medium diameter is assigned to the third forward gear ($3^{rd}$) and meshes with an idler gear 52 of the upper countershaft 40. In the gear plane of this idler gear, there is no gear on the lower countershaft 34. The fixed gear 46 of the inner shaft 22 which has the smallest diameter is assigned to the first forward gear ($1^{st}$) and meshes with an idler gear 54 of the lower countershaft 34.

On the right-hand side of the idler gear 32 assigned to the second forward gear ($2^{nd}$), a gear change clutch 56 is arranged on the lower countershaft 34. By means of this gear change clutch 56, the idler gear 32 referred to above can be coupled to the countershaft 34 for rotation therewith, so that a torque can be transmitted to a driven pinion 58 located on the right-hand end in front of the tapered roller shaft bearing.

This small drive pinion 58 and a larger drive pinion 60 located at the right-hand end of the upper countershaft 40 in front of the tapered roller bearing thereof mesh with a drive spur gear 62 of the differential 14.

The gear change clutch 56 can further be coupled to the idler gear 36, so that a non-rotatable connection can be established between the lower countershaft 34 and the idler gear 36 for engaging the fourth forward gear ($4^{th}$).

The lower countershaft 34 is provided with a further gear change clutch 64 located axially between the two idler gears 48, 54, by means of which one of the two idler gears 48, 54 can alternatively be coupled non-rotatably to the lower countershaft 34 for engaging either the fifth forward gear $5^{th}$ or the first forward gear $1^{st}$.

Coaxially on the upper countershaft 40, a gear change clutch 66 is provided between the two idler gears 50, 52 which are assigned to the seventh forward gear ($7^{th}$) and the third forward gear ($3^{rd}$). By means of this gear change clutch 66, the idler gear 50 or the idler gear 52 can be coupled to the countershaft 40 for rotation therewith.

A further gear change clutch 68 is assigned to the sixth forward gear ($6^{th}$).

The inner shaft 22 is supported within the hollow shaft 24 in an antifriction arrangement by two double-row needle bearings. Axially between the two needle bearings, a conical region is provided. On the left-hand end, the inner shaft has a blind hole which is provided with transverse bores at the needle bearings axially in front of and behind the conical region. These transverse bores supply the two needle bearings with lubricant and coolant. For supplying the lubricant and coolant into the blind hole, an insertion sleeve projects into an inlet region of the blind hole.

The two countershafts 34, 40 are provided with similar lubricant supplies at their right-hand ends. These are however installed immediately into bearing bosses of the partition. The two countershafts 34, 40 are further provided with central and transverse bores for a lubricant supply, in particular for the needle bearings of the idler gears, but also for tooth engagement.

With the twin-clutch transmission 10 described above, a drive power can be transmitted to the differential 14 and to the front axle 20 in the single reverse gear (Rev) via the second main clutch,
in the first forward gear ($1^{st}$) via the first main clutch,
in the second forward gear ($2^{nd}$) via the second main clutch,
in the third forward gear ($3^{rd}$) via the first main clutch,
in the fourth forward gear ($4^{th}$) via the second main clutch,
in the fifth forward gear ($5^{th}$) via the first main clutch,
in the sixth forward gear ($6^{th}$) via the second main clutch, and
in the seventh forward gear ($7^{th}$) via the first main clutch.

That means that each gear is load-shiftable to the sequentially adjacent gear, because a gear change involves a change of the main clutch.

Figure 2:
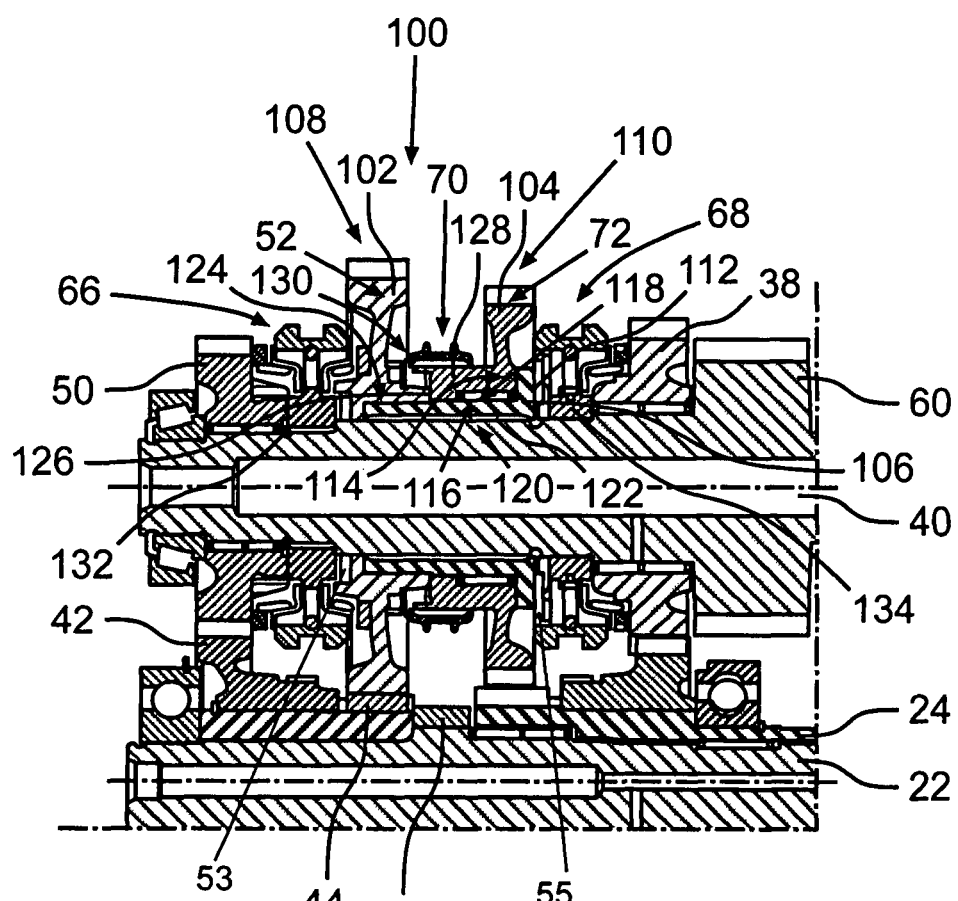
FIG. 2 shows a section of FIG. 1 in a detailed engineering drawing.

In order to engage the reverse gear Rev before the engagement of the second main clutch in the wheel set, the two gear change clutches are engaged. For this purpose, a selector sleeve 70 described with reference to FIG. 2 is pushed axially towards the left. This establishes a non-rotatable connection between two idler gears which can then jointly rotate relative to the upper countershaft 40. A selector sleeve of the gear change clutch 64 is further pushed axially towards the right, so that the idler gear 54 of the first forward gear ($1^{st}$) is non-rotatably coupled to the lower countershaft 34. The power flow of the reverse gear (Rev) coming from the drive engine 12 then runs from the second main clutch via the hollow shaft 24 to the fixed gear 30 mounted thereon for rotation therewith,
the idler gear 32 assigned to the second forward gear ($2^{nd}$), which meshes with the fixed gear 30,
the idler gear 72 assigned to the reverse gear (Rev), which meshes with the idler gear 32
the idler gear 52 assigned to the third forward gear ($3^{rd}$), which is connected for rotation with the idler gear 72 by means of the selector sleeve 70,
the middle fixed gear 44 on the inner shaft 22, which meshes with the idler gear 52,
the small (right-hand) fixed gear on the inner shaft 22, which is joined to the fixed gear 44,
the idler gear 54 assigned to the first forward gear ($1^{st}$), which meshes with the small fixed gear 46,
the small driven pinion 58, which is connected to the idler gear 54 by means of the gear change clutch 64,
the drive gear 62 of the differential 14, which meshes with the small driven pinion 58, and to the drive shafts 16, 18 for output to a front axle 20.

FIG. 2 shows a detail of FIG. 1 with the selector sleeve 70 (gear change clutch) for selecting the idler gears 52, 72, which form a selectable twin gear 100 arranged between the idler gears 52 and 72. The selectable twin gear 100 formed by the two idler gears 52, 72 represents an assembly in the particularly preferred embodiment of the invention shown in FIG. 2, having a first gear body 102 and a second hear body 104 which are captively joined to each other by a bearing sleeve 106. The first gear body 102 is provided with helical toothing 108 by means of which this gear body 102, which is assigned to the third forward gear, meshes as an idler gear with the middle fixed gear 44 of the inner shaft 22. The second gear body 104 has straight teeth.

The bearing sleeve 106 which holds the two gear bodies 102, 104 together is in the form of a thin-walled tube with a collar 112, the collar 112 forming on its inside a stop 114 against which the second gear body 104 bears. The bearing sleeve 106, which is not subjected to any drive torque and can therefore be thin-walled, has on its outside a first location region 116 for a first needle bearing 118 which supports the second gear body. On its inside the bearing sleeve 106 has a second location region 120 for a second needle bearing 122 which supports the shiftable twin gear 100 on the upper countershaft 40.

As the bearing sleeve 106 is thin-walled and pressed into an axial location recess 124 in the first gear body 102, the collar 112 and the first gear body 102 projecting radially outwards beyond the bearing sleeve 106 provide a U-shaped location region for the second gear body 104, the second gear body 104 being rotatable with regard to the bearing sleeve 107 depending on the position of the selector sleeve 70.

The axially opposite annular surfaces which delimit the location region for the second gear body 104 and one of which forms the stop 114 are designed as friction bearing surfaces. In accordance with this, the annular sections of the second gear body 104, which relate to these surfaces and extend at right angles to the design axis, are likewise designed as friction bearing surfaces. One of these annular sections, i.e. the second annular section 126 of the second gear body, which is shown on the left-hand side in FIG. 2, is related to the first annular section 128 of the first gear body 102, so that the second gear body 104 is securely supported in the axial direction. In order to establish—in a conventional manner—a non-rotatable connection between the first and second gear bodies 102, 104 via the selector sleeve 70 in a state of synchronous rotation of the two gear bodies, synchroniser parts 130 are provided on the first and second gear bodies.

Installed into a twin-clutch gearbox 10 as shown in FIG. 2, the selectable twin gear 100 is supported on the countershaft 40 only by means of two axial thrust bearings 53, 55, these axial thrust bearings 53, 55 being formed on a first and second synchronizing body 132, 134 respectively. The synchronizing bodies 132, 134 are components of the gear change clutches 66, 68.

With a twin-clutch transmission 10, travelling in the third gear is the critical load case. Owing to the design of the reverse gear, the idler gears 52, 72 (gear bodies 102, 104) rotate in opposite directions in this gear, which may result in a very high differential speed between these gears. This high differential speed is however no longer relevant as far as the bearings are concerned, because the idler gear 52 (gear body 102) is supported at one side on the synchronizing body 132 and at the other side on the synchronizing body 134 via the bearing sleeve 106 while bypassing the idler gear 72 (gear body 104).

The particularly preferred embodiment of the switchable twin gear 100 as shown in FIG. 2 therefore avoids high differential speeds in the critical load case, whereby the operation and the structure of a twin-clutch transmission 10 according to the invention are improved in the particularly preferred embodiment.

With respect to the operation of the particularly preferred embodiment of a twin-clutch transmission 10, it should further be mentioned that the idler gear 52 of the twin gear 100 can be connected for rotation with the countershaft 40 by means of the gear change clutch 66 on the upper countershaft 40, which comprises the synchronizing ring 132.

The synchronizing ring 132 is connected to the countershaft 40 for rotation therewith. The synchronizing ring 132 is also provided for coupling to the idler gear 50. For this purpose, the synchronizing ring 132 supports an axially movable shift sleeve of the gear change unit, by means of which the synchronizing ring can be non-rotatably coupled to the idler gear 52 of the twin gear 100 or alternatively to the idler gear 50. The shift sleeve has on its outer circumference a continuous groove for the engagement of a shift fork or lever not shown in detail.

In the diagrammatic representation according to FIG. 1, the gear change clutches are shown exclusively as positive-locking shift claw clutches. The gear change clutches in the more detailed FIG. 2, on the other hand, are synchroniser rings. In practical applications, both synchroniser rings and shift claw clutches can be used.

The two driven pinions do not have to be different in diameter as shown in the drawing. In an alternative embodiment, the two driven pinions may have the same diameter.

Figure 3:
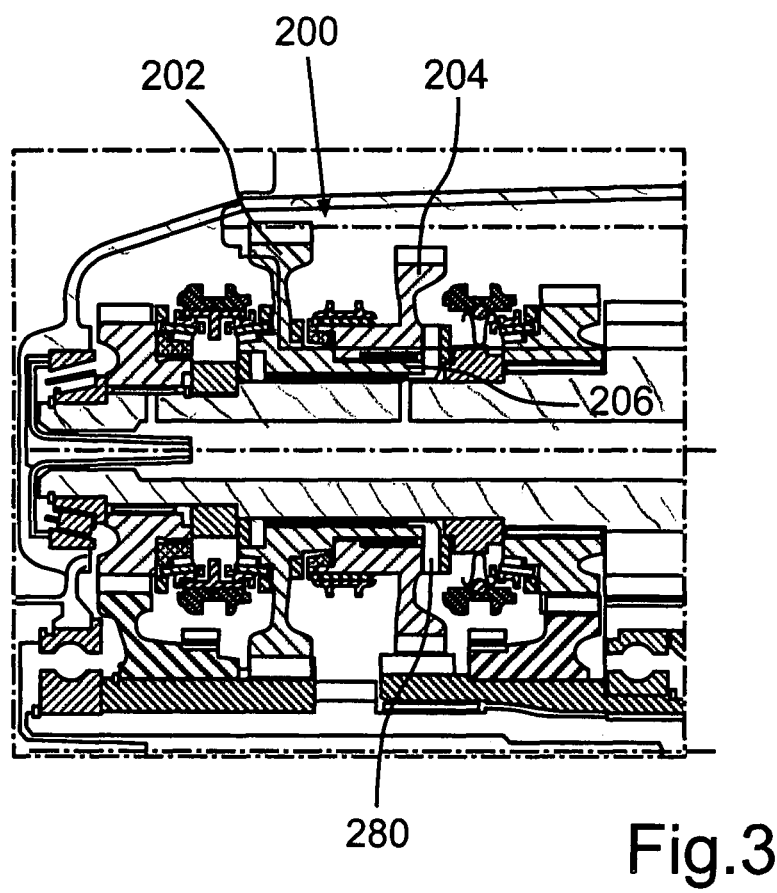
FIG. 3 shows a second embodiment for the structural configuration of the section shown in FIG. 2.

A twin-clutch transmission which is in every respect built like, and operates like, the first embodiment of the twin-clutch transmission 10 described above can also be represented in a particular embodiment if—as shown in FIG. 3—a selectable twin gear 200 is provided which comprises a bearing sleeve 206 which is integrated with the first gear body 102. For the axial support of the sleeve 206 and of a second gear body 204, a thrust washer 280 is provided in this case. This does not change the operation of the unit in any way. The only differences reside in the production of the components and the assembly. The advantage of bypassing the second gear body 204 in the support of the first gear body 202 in the critical load case is retained.

Both of the shown embodiments permit the use of standard components, so that manufacture is simplified. Both of the preferred embodiments have shorter tolerance chains than prior art arrangements, and the adjustment of the bearing mounting arrangement is simplified.

What is claimed is:

1. A shiftable twin gear for a twin-clutch transmission, comprising a first gear body (102) to be supported with respect to a shaft (40) and a second gear body (104), which gear bodies can be coupled to each other for common rotation, comprising a bearing sleeve (106) connected to the first gear body (102) for rotation therewith and having a first bearing region for supporting the second gear body (104), the bearing sleeve (106) being a separate component and the first gear body (102) being mounted on the bearing sleeve (106) by a press fit for rotation with the bearing sleeve (106), the bearing sleeve being a thin-walled tube with a collar (112) forming, at its end opposite the first gear body (102), a stop (114) against which the second gear body (104) bears.

2. The shiftable twin gear according to claim 1, wherein the bearing sleeve (106) has on its outside a first location region (116) for a first needle bearing (118) for the support of the second gear body (104).

3. The shiftable twin gear according to claim 1, wherein a first annular section (128) of the first gear body (102) and a second annular section (126) of the second gear body (104) are in the form of opposite friction bearing surfaces.

4. The shiftable twin gear according to claim 1, wherein the bearing sleeve (106) has a support surface (132) on its end face.

5. The shiftable twin gear according to claim 1, wherein a first and second thrust bearing are provided for axial support, the thrust bearings being formed in sections on a first and, respectively, second synchronizing rings (132, 134), the synchronizing rings (132, 134) forming an assembly of gear change clutches.

6. The shiftable twin gear according to claim 1, wherein synchronizer parts (130) are provided on the first and second gear bodies (102, 104).

7. A twin-clutch transmission, with a hollow shaft (24) and a concentric inner shaft (22) at least one of which can be coupled to a drive engine (12) via a twin clutch (26), with a first and a second countershaft (34, 40) having drive pinions (58, 60) meshing a drive gear (62) of a differential unit (14), the hollow shaft (24) being provided with fixed gears (28, 30) meshing with idler gears rotatably mounted on the first and the second countershafts (34, 40), respectively, with a first idler gear (72) for forming the reverse gear being rotatably supported on a bearing sleeve (106) and being arranged adjacent to a second idler gear (52) for representing a forward gear, the first idler gear (72) forming the reverse gear and the adjacent second idler gear (52) for establishing a forward gear being in the form of a shiftable twin gear structure (100) the second idler gear (52) being mounted by a press fit to the bearing sleeve (106) for rotation with the bearing sleeve (106) the bearing sleeve (106) being a separate component and the first gear body (102) being mounted on the bearing sleeve (106) by a press fit for rotation with the bearing sleeve (106), the bearing sleeve being a thin-walled tube with a collar (112) forming, at its end opposite the first gear body (102), a stop (114) against which the second gear body (104) bears.

* * * * *